(12) United States Patent
Nonaka et al.

(10) Patent No.: US 7,457,526 B2
(45) Date of Patent: Nov. 25, 2008

(54) RECORDING/REPRODUCING APPARATUS FOR VIDEO/AUDIO SIGNALS

(75) Inventors: Tomoyuki Nonaka, Fujisawa (JP); Katsuyuki Watanabe, Mito (JP); Manabu Sasamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 888 days.

(21) Appl. No.: 10/839,957

(22) Filed: May 5, 2004

(65) Prior Publication Data

US 2005/0036765 A1 Feb. 17, 2005

(30) Foreign Application Priority Data

Aug. 12, 2003 (JP) ............................. 2003-207247
Aug. 12, 2003 (JP) ............................. 2003-207256

(51) Int. Cl.
*H04N 7/26* (2006.01)
(52) U.S. Cl. ..................................... 386/109; 386/124
(58) Field of Classification Search .................. 386/46, 386/94, 95, 109, 124–126; 380/200–242, 380/277–286; 705/50–59; 713/160–181; 359/118; 725/66

See application file for complete search history.

(56) References Cited

U.S. PATENT DOCUMENTS

| 5,886,957 | A |   | 3/1999 | Yokota et al. |   |
|---|---|---|---|---|---|
| RE38,007 | E | * | 2/2003 | Tsukamoto et al. | ......... 380/203 |
| 2002/0087303 | A1 |   | 7/2002 | Sugiyama |   |

FOREIGN PATENT DOCUMENTS

| EP | 0475839 | A3 | 3/1992 |
|---|---|---|---|
| JP | 08-077706 |  | 3/1996 |
| JP | 08-297917 |  | 11/1996 |

(Continued)

OTHER PUBLICATIONS

"Velocity Router VFS226," product datasheet Chaparral Network Storage, Inc. Longmont, CO (2002).

(Continued)

*Primary Examiner*—Thai Tran
*Assistant Examiner*—Mishawn Dunn
(74) *Attorney, Agent, or Firm*—Townsend and Townsend and Crew LLP

(57) ABSTRACT

For providing a recording/reproducing apparatus, for recoding and reproducing a digital signal onto first and second recording media 200 and 300, in particular, being simple in the controlling method when conducting data copying between those recording media, being difference in the control formats thereof, comprising: a memory 104 for storing therein the digital signal, temporality; an input/output portion 101, through which a control signal and the digital signal for use of recording and reproducing are inputted and outputted; a controller 102 for performing two (2) kinds of controlling, being different from each other, with respect to said first and second recording media, upon basis of a one (1) kind of control signal inputted at said input/output portion; and an arbiter 103 for arbitrating and processing the digital signal in a time-sharing manner among said first recoding medium, said second recording medium and said memory, wherein the signal recorded in the first recording medium 200 recorded onto the second recording medium 300 through the memory 104, thereby making a copy of data between the recording media differing from, but without passing through the input/output portion 101.

10 Claims, 12 Drawing Sheets

FOREIGN PATENT DOCUMENTS

| | | |
|---|---|---|
| JP | 2000-076136 | 3/2000 |
| JP | 2000-357370 A | 12/2000 |
| JP | 2001-125833 | 5/2001 |
| JP | 2002-152658 | 5/2002 |
| JP | 2002-185926 A | 6/2002 |
| JP | 2002-203361 | 7/2002 |
| JP | 2002-203366 | 7/2002 |
| JP | 2002-218393 | 8/2002 |
| JP | 2002-330401 A | 11/2002 |
| JP | 2002-354217 | 12/2002 |
| JP | 2003-061032 | 2/2003 |
| JP | 2003-111020 A | 4/2003 |
| JP | 2003-15222 A | 5/2003 |
| JP | 2003-167686 A | 6/2003 |
| JP | 2003-173615 A | 6/2003 |
| JP | 2004-048127 A | 2/2004 |
| JP | 2004-072440 A | 3/2004 |

OTHER PUBLICATIONS

Campbell "The Advantages of Native Fibre Channel and the Importance of Providing Severless Backup in the Tape Drive," product whitepaper Exabyte Corporation Boulder CO (2000).

Weber "SCSI-3 Primary Commands," draft proposed to American National Standard for Information Systems Mar. 28, 1997, ANSI T10/995D revision 11a (1997).

* cited by examiner

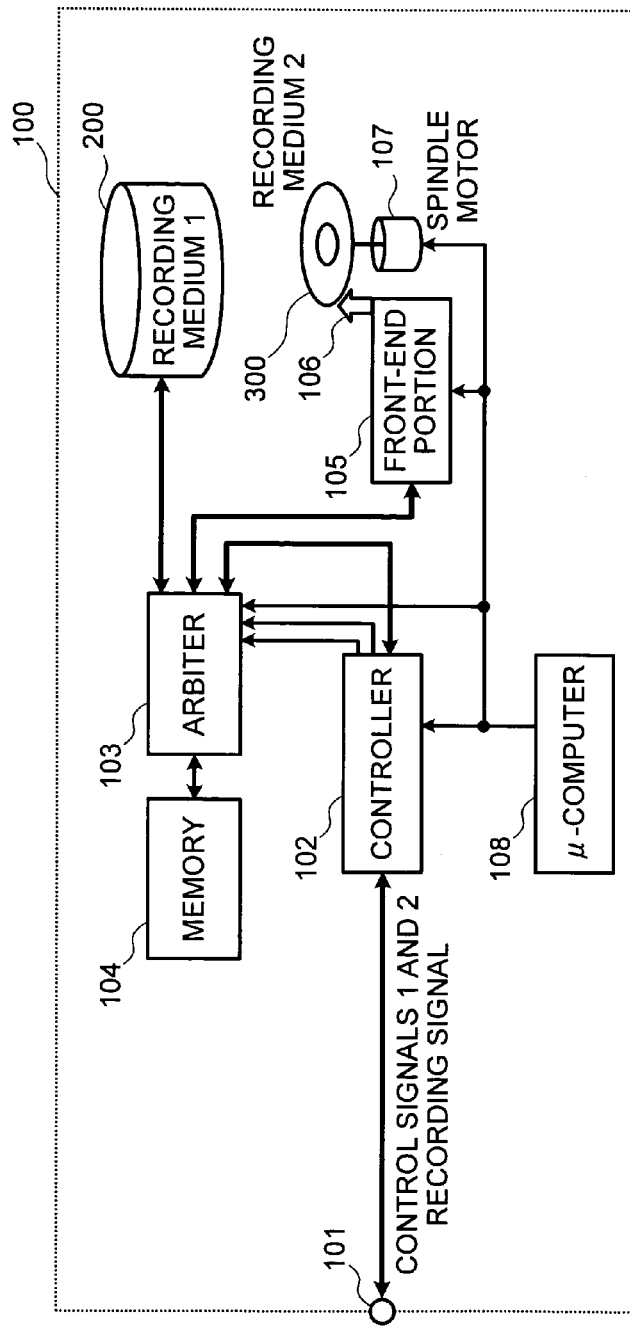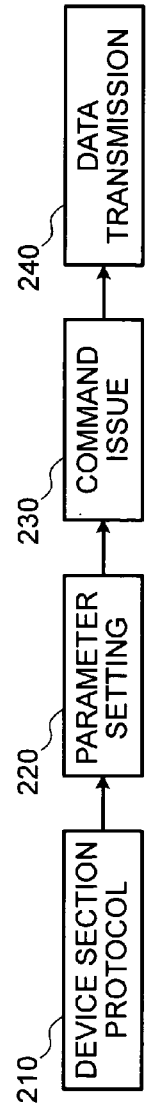

FIG.5

| BITE | CONTENTS |
|---|---|
| 0 | COMMAND CODE |
| 1 | PARAMETER 0 |
| 2 | PARAMETER 1 |
| 3 | PARAMETER 2 |
| 4 | PARAMETER 3 |
| 5 | PARAMETER 4 |
| 6 | PARAMETER 5 |
| 7 | PARAMETER 6 |
| 8 | PARAMETER 7 |
| 9 | PARAMETER 8 |
| 10 | PARAMETER 9 |
| 11 | PARAMETER 10 |

FIG.6

| REGISTER | 7 | 6 | 5 | 4 | 3 | 2 | 1 | 0 |
|---|---|---|---|---|---|---|---|---|
| Featuers | MOVE | COPY | H/D | na | na | na | OVL | DMA |
| Sector Count | TAG | | | | | na | na | Na |
| Sector Number | Na | | | | | | | |
| Cylinder Low | Byte Count Limit [7 : 0] | | | | | | | |
| Cylinder High | Byte Count Limit [15 : 8] | | | | | | | |
| Device/Head | obs | na | obs | DEV | na | na | na | na |
| Command | A0h | | | | | | | |

FIG.7

| BITE | 7 | 6 | 5 | 4 | 3 | 2 | 1 | 0 |
|---|---|---|---|---|---|---|---|---|
| 0 | COMMAND CODE: ||||||||
| 1 | TRANSMISSION SIZE [15 : 8] ||||||||
| 2 | TRANSMISSION SIZE [7 : 0] ||||||||
| 3 | RESERVATION |||| RECORDING MEDIUM 1LBA [27 : 24] ||||
| 4 | RECORDING MEDIUM 1LBA [23 : 16] ||||||||
| 5 | RECORDING MEDIUM 1LBA [15 : 8] ||||||||
| 6 | RECORDING MEDIUM 1LBA [7 : 0] ||||||||
| 7 | RECORDING MEDIUM 2LBA [31 : 24] ||||||||
| 8 | RECORDING MEDIUM 2LBA [23 : 16] ||||||||
| 9 | RECORDING MEDIUM 2LBA [15 : 8] ||||||||
| 10 | RECORDING MEDIUM 2LBA [7 : 0] ||||||||
| 11 | RESERVATION ||||||||

FIG.8

| REGISTER | 7 | 6 | 5 | 4 | 3 | 2 | 1 | 0 |
|---|---|---|---|---|---|---|---|---|
| Features | na ||||||||
| Sector Count | TRANSMISSION SIZE [7 : 0] ||||||||
| Sector Number | RECORDING MEDIUM 1LBA [7 : 0] ||||||||
| Cylinder Low | RECORDING MEDIUM 1LBA [15 : 8] ||||||||
| Cylinder High | RECORDING MEDIUM 1LBA [23 : 16] ||||||||
| Device/Head | obs | na | obs | DEV | RECORDING MEDIUM 1LBA [27 : 24] ||||
| Command | 20h ||||||||

FIG.9

| BITE | 7 | 6 | 5 | 4 | 3 | 2 | 1 | 0 |
|---|---|---|---|---|---|---|---|---|
| 0 | COMMAND CODE: 2A | | | | | | | |
| 1 | ABOLITION | | | DPO | FUA | RESERVATION | | Re1Adr |
| 2 | RECORDING MEDIUM 2LBA [31 : 24] | | | | | | | |
| 3 | RECORDING MEDIUM 2LBA [23 : 16] | | | | | | | |
| 4 | RECORDING MEDIUM 2LBA [15 : 8] | | | | | | | |
| 5 | RECORDING MEDIUM 2LBA [7 : 0] | | | | | | | |
| 6 | RESERVATION | | | | | | | |
| 7 | TRANSMISSION SIZE [15 : 8] | | | | | | | |
| 8 | TRANSMISSION SIZE [7 : 0] | | | | | | | |
| 9 | VENDER DEFINITION | | | RESERVATION | | | NACA | FLAG | LINK |
| 10 | PAD | | | | | | | |
| 11 | PAD | | | | | | | |

FIG.12

| REGISTER | 7 | 6 | 5 | 4 | 3 | 2 | 1 | 0 |
|---|---|---|---|---|---|---|---|---|
| Featuers | MOVE | COPY | H/D | ENC | na | na | OVL | DMA |
| Sector Count | TAG | | | | | na | na | Na |
| Sector Number | Na | | | | | | | |
| Cylinder Low | Byte Count Limit [7 : 0] | | | | | | | |
| Cylinder High | Byte Count Limit [15 : 8] | | | | | | | |
| Device/Head | obs | na | obs | DEV | na | na | na | na |
| Command | A0h | | | | | | | |

RECORDING/REPRODUCING APPARATUS FOR VIDEO/AUDIO SIGNALS

BACKGROUND OF THE INVENTION

1. Field of the Invention

The present invention relates to a recording/reproducing apparatus enabling data transmission between the different recording media, effectively, and in particular, it relates to a recording/reproducing apparatus for video/audio signals.

2. Description of the Related Arts

In recent years, in the place of the videotape recorders for home use, so-called HDD recorders are spreading rapidly and distributed widely, which applies a hard disk as the recording medium therein. Among of those, there is a large demand, in particular, upon an integral-type recorder, which enables the recording/reproducing from/onto other recording medium being different from the HDD, such as, the conventional videotape or a DVD-RAM (i.e., Digital Versatile Disc Random Access Memory), etc. In the case where the HDD and the DVD-RAM can be integrated into one body, for example, broadcasting programs received are recorded onto the HDD, temporarily, and only favorite ones among of them are copied or moved onto the DVD-RAM or the videotape recorder, for the purpose of preservation or saving, while deleting the data recorded on the HDD and so on, thereby improving the usability thereof.

The apparatus, for recoding/reproducing of such the digital signals, is able to record contents of a large capacity in a digital manner; therefore, it is easy to make a copy of the video signals, etc. And, further since no such the deterioration occurs that appears when recording/reproducing the signals in an analog manner; therefore, there is a necessity of the technology for the purpose of protection of the copyright thereof.

As one of such the technologies, which can be used for protection of the copyright, there can be listed up an encryption of the contents. As the prior art for achieving such the copyright protection within the HDD recorder mentioned above, it is disclosed, such as, in Japanese Patent Laying-Open No. 2003-167686 (2003) for example. Further, in the prior art for achieving the copyright protection within the DVD recorder, as is disclosed in Japanese Patent Laying-Open No. 2000-357370 (2000), for example, the video information is encrypted when being recorded, and therefore it cannot be reproduced if it is not decrypted in accordance with a predetermined process. Also, as the prior art for achieving the copyright protection between the HDD recorder and the videotape recorder, a technology is already known in Japanese Patent Laying-Open No. 2003-173615 (2003), for example.

BRIEF SUMMARY OF THE INVENTION

The product of integrating the HDD and the DVD recorder into one body is now widely spreading, however it is still an expensive or luxury one. However, in near future, it is expected, while advancing to be large in the capacity thereof, that the HDD comes to be small, further, in the sizes thereof. Even on the way of doing so, the copyright protection is an indispensable or essential technical item. In the case where the HDD and the DVD recorder are integrated into one body, as is disclosed in the Japanese Patent Laying-Open No. 2003-167686 (2003), the copyright protection can be achieved with the provision of a recording portion, a reproducing portion and a controller portion for each of the HDD and the DVD-RAM, however it brings about complication on the controlling method or system thereof, and further an increase of an area for mounting on a circuit board. In the disclosure of the Japanese Patent Laying-Open No. 2000-357370 (2000) mentioned above, for achieving the copy between the HDD and the DVD-RAM, it is necessary to issue a control command to each of the HDD and the DVD-RAM. Also, when reproducing, a large amount of copying data is transferred on a PCI bus; therefore, a load comes to be large for other processing therein.

According to the present invention, for dissolving such the problems of the conventional arts, as was mentioned above, it is an object to provide a recording/reproducing apparatus for enabling data transfer between the different recording media, effectively.

Further, in the digital recorder combining a recordable optical disk with the hard disk mentioned above, an encryption processor portion for recording/reproducing of the hard disk is necessary, but separating from an encryption processor portion for recording/reproducing on/from the recordable-type of optical disk; therefore the circuit scale thereof comes to be large. Also, when copying from the hard disk onto the recordable-type optical disk, it is necessary to control the respective encryption processor portions of the hard disk and the recordable-type optical disk, at the same time; therefore, the load upon the controller portion comes to be heavy.

Then, according to the present invention, for dissolving such the problems of the conventional arts, as was mentioned above, it is an object to provide a recording/reproducing apparatus for enabling the data transfer between the recording medium, and also the data transfer between the different recording media, with safety and effectiveness.

According to the present invention, for achieving such the object as was mentioned above, there is provided a recording/reproducing apparatus, for recoding and reproducing a digital signal onto first and second recording media, comprising: a memory for storing therein the digital signal, temporality; an input/output portion, through which a control signal and the digital signal for use of recording and reproducing are inputted and outputted; a controller for performing two (2) kinds of controlling, being different from each other, with respect to said first and second recording media, upon basis of a one (1) kind of control signal inputted at said input/output portion; and an arbiter for arbitrating and processing the digital signal in a time-sharing manner among said first recoding medium, said second recording medium and said memory.

And, in the structure mentioned above, the signal recorded onto the first recording medium is recorded onto the second recording medium through the memory, thereby conducting a copy of data, etc., between the recording media differing from, but without passing through the input/output portion.

Also, according to the present invention, there is provided a recording/reproducing apparatus, for recoding and reproducing a digital signal onto first and second recording media, comprising: a memory for storing therein the digital signal, temporality; an input/output portion, through which a control signal and the digital signal for use of recording and reproducing are inputted and outputted; a controller for performing two (2) kinds of controlling, being different from each other, with respect to said first and second recording media, upon basis of a one (1) kind of control signal inputted at said input/output portion; an encryptor for encrypting the digital signal; a decryptor for decrypting the digital signal encrypted; and an arbiter for arbitrating and processing the digital signal in a time-sharing manner among said first recoding medium, said second recording medium, said encryptor, said decryptor, and said memory.

In the structure mentioned above, the digital signal recorded onto said first recording medium is decrypted within the dectyptor, and is re-encrypted within the encryptor, to be recorded onto said second recording medium, thereby making a copy thereof with achieving the copyright protection thereof.

Further, according to the present invention, there is also provided a recording/reproducing apparatus, comprising: a first encryptor/decryptor for encrypting and decrypting the digital signal inputted/outputted at said input/output portion; a second encryptor/decryptor for encrypting and decrypting the digital signal to be recorded and reproduced onto/from said first recording medium; a third encryptor/decryptor for encrypting and decrypting the digital signal to be recorded and reproduced onto/from said second recording medium; a memory for storing the digital signal therein, temporally; and an arbiter for arbitrating write-in and read-out of the digital signal among said first and second recording media, said first, second and third encriptor/decriptor, and said memory, in a time-sharing manner.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 1 is a block diagram for showing the structure of the recording/reproducing apparatus, according to a first embodiment of the present invention;

FIG. 2 is a view for showing a command protocol of ATA interface;

FIG. 5 is a view for showing commands of the ATAPI;

FIG. 6 is a view for showing additional parameters and commends, in the first embodiment of present invention;

FIG. 7 is also a view for showing the additional parameters and the commends, in the first embodiment of present invention;

FIG. 8 is a further view for showing the additional parameters and the commends, in the first embodiment of present invention;

FIG. 9 is also a further view for showing the additional parameters and the commends, in the first embodiment of present invention;

FIG. 12 is a view for showing additional parameters and commends, in the second embodiment of present invention;

DETAILED DESCRIPTION OF THE INVENTION

Figures 3, 4:
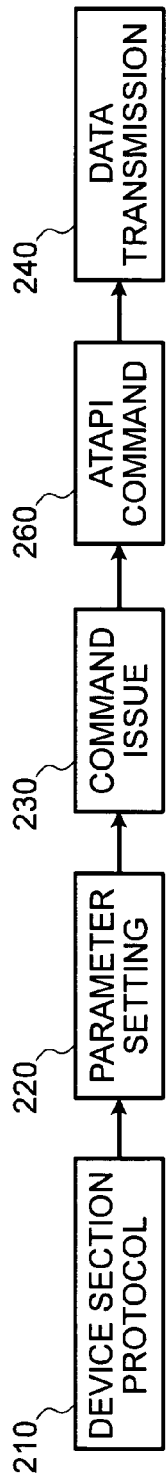
FIG. 3 is a view for showing parameters and commands of the ATA interface.
FIG. 4 is a view for showing a command protocol of ATAPI.

Hereinafter, embodiments according to the present invention will be fully explained by referring to the attached drawings. Herein, FIG. 1 is an outlook view for showing the first embodiment of the recording/reproducing apparatus, into which the present invention is applied, wherein a reference numeral 101 depicts an input/output portion for inputting/outputting a control signal and recording/reproducing data to a hard disk drive (HDD) and an optical disk drive, and it is constructed with, for example, 16 pins of data bus and 40 pins of control signals, such as, address signals, etc. A reference numeral 102 depicts a controller for decoding the control signals and the data bus, thereby controlling commands to be issued. A reference numeral 103 depicts an arbiter (an arbitration portion) for processing reading/writing into a memory 104 in the time-sharing manner. The reference numeral 104 depicts the memory, and a reference numeral a front-end portion for converting the signals supplied from the arbiter 103. A reference numeral 106 depicts an optical pickup portion, and 107 a spindle motor for rotating the optical disk. A reference numeral 108 depicts a controller for controlling the controller 102, the arbiter 103 and the optical disk drive, and in more details, it is made up with a microcomputer, for example. A reference numeral 200 depicts the HDD, as a first recording medium, and 300 the optical disk, as a second recoding medium. As the optical disk, the DVD-ROM, etc., can be used for it, and it is removable with respect to the drive thereof.

FIG. 2 is a view for showing an example of a control signal, which is inputted from the input/output portion 101, and in particular, it shows an example of command protocol of an ATA (AT Attachment) interface, being used, in particular, in the control of the HDD. In accordance with the ATA command protocols, first of all, processing is conducted upon a device section protocol 210, thereby confirming that the bus of the HDD is in an idle condition or not. If the bus of the HDD is in the idle condition, then processing is executed upon setting parameter of the command 220, and at the time point when the parameter is determined, the processing is conducted on command issue 230, thereby starting data transfer 240 to the HDD.

FIG. 3 shows examples of the processing of the setting parameter 220 and the command issue 230, in more details thereof. The parameter and the command correspond to those, which are obtained through decoding the combination of a chip select signal of two (2) bits and an address signal of three (3) bits. If the parameter is made up with five bits, assuming that the chip select is upper bits while the address lower ones; then it includes the following six combinations: "10001" is "Features"; "10010" is "Sector Counts"; "10011" is "Sector Number"; "10100" is "Cylinder Low"; "10101" is "Cylinder High"; and "10110" is "Device/Head", and for each of the parameters, data 251 to 258 of eight (8) bits thereof has a meaning, respectively. In more details thereof, for example, data 1 of the "Features", being "OVL", is a bit indicative of that an overlap is "able/unable", but "na" from data 7 to data 2 are indicative of that they are bits, on which no meaning is defined.

"10111" corresponds to "command", and the control on the HDD is determined through decoding of the data of eight (8) bits. As an example, "A0h" in the figure indicates a packet command, "30h" a write sector command, and "20h" a read sector command, respectively. With the "command", the control contents are not assigned to all of the combinations of the eight (8) bits, but those are kept for reservation.

FIG. 4 is a view for showing an example of the control signal inputted from the input/output portion 101, and in particular, an example of the command protocol of ATAPI (ATA Packet Interface), which is used for control of the DVD-RAM. An aspect differing from the ATA shown in FIG. 2 mentioned above lies in that an ATAPI command 260 is issued only when the command issue 230 is a packet command, and thereafter is conducted data transfer 240 thereof.

FIG. 5 a view for showing the detail of the ATAPI command 260, therein. Almost of the cases, the command packet is constructed with a command code 261 of one (1) bite and parameters 262-272 of eleven (11) bites. As is apparent from FIGS. 2 and 4, the ATAPI command is a kind of that, which can be obtained by extending the ATA command.

FIG. 6 shows an example of the control signals for one system, which are inputted into the input/output portion 101, wherein a move mode: "MOVE", a copy mode: "COPY" and a parameter of setting "H/D", for determining the directions of "MOVE" and "COPY" are shown. Thus, "MOVE" is assigned at the seventh bit of the "Feature" register, while "COPY" and "H/D" at the sixth and the fifth bit thereof.

Also, FIG. 7 shows the ATAPI commands at this time. Into the parameter of 0 bite 281 is give "D0h", for example, being a number for which no command code is defined at the present. Into the parameters of 1 bite 282 and 2 bites 283 are given data sizes for making a copy between the recording media. Into the parameters of 3 bites 284, 4 bites 285, 5 bites 286, and 6 bites 287 are given the logical addresses for the purpose of conducting read-out from the HDD 200. And, also into the parameters of 7 bites 288, 8 bites 289, 9 bites 290 and 10 bites 291 are given the logical addresses of destinations for conducting write-in into the DVD-RAM 300.

Explanation will be give about the operation of copying (COPY) data which was recorded onto the HDD 200 onto the DVD-RAM 300, with using those control signals.

Figure 10:
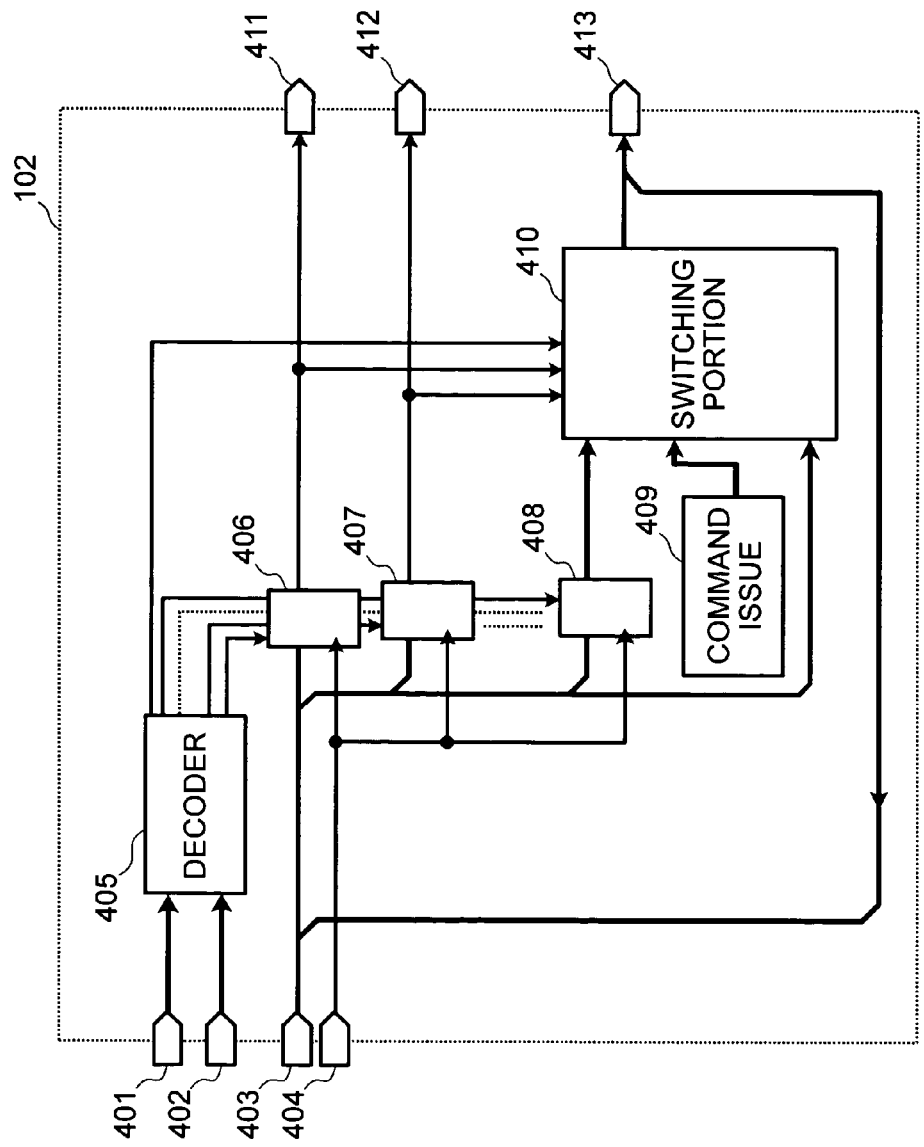
FIG. 10 is a block diagram for showing the structure of a controller portion, according to the first embodiment of the present invention.

The control signals of one system, upon which the parameters shown in FIG. 6 are reflected, are supplied from the input/output portion 101 into the controller 102. FIG. 10 shows an embodiment of the controller 102, wherein the chip select signal of 2 bits within the input/output portion 101 is supplied into an input 401, the address signal of 3 bits into an input 402, the data bus of 16 bits into an input/output 403, and a write-enable signal into the input 404, respectively. The chip select and the address are supplied to a decoder 405, for producing an enable pulse when decoding a command, so as to supply it to data latches 406, 407 and 408. Those data latches are supplied with the data bus of 18 bits or 8 bits, and are also supplied with enable pulses from the decoder 405, and further they renew data only at a rise-up edge, being an effective period for write-enable, while keeping the previous values at the time other than that.

With such the structure, while decoding the "Features" parameter, a result of detection, that the "MOVE" at the seventh bit is "0" and also that the "COPY" at the sixth bit is "1", corresponds to a data latch 407, and a result of detection upon "H/D" at the fifth bit of the "Features" parameter corresponds to the data latch 407. In the similar manner, while decoding the 0 bit from "7" of the command resistor and also setting it into "1" when the value thereof is "A0h", a result detecting, that the command arriving at is the packet command, corresponds to an output of a data latch 408. Also, the data bus 403 is inputted into one of a switching portion 410, while the other thereof is connected to a command issue portion 409, thereby building up the structure for outputting the data bus 403 therefrom. And, in a case when the command arriving at is the packet command and the "COPY" is "1", the switching portion 410 is changed to the command issue portion 409.

Following the command packet is inputted the ATAPI command shown in FIG. 7. The ATAPI command is supplied to the command issue portion 409, and it detects the data transfer size of the parameters 1 and 2, the logical addresses on the HD for the parameters 3, 4, 5 and 6, and the logical addresses on the DVD-RAM 300 for the parameters 7, 8, 9 and 10. At this time point, it is possible to issue the control signals for two (2) systems from the ATAPI command of one (1) system inputted into the input/output portion 101.

FIGS. 8 and 9 show an example of the additional parameters and commends indicative of the control signals of the different two (2) systems in the first embodiment. Those are memorized in a ROM, for example, of the command issue portion 409. The data transfer size 222 of "READ sector command" to the HDD 200 and the logical addresses 223-226 are substituted with the detected results thereof, and are outputted to the arbiter 103. Also, in the similar manner, the data transfer sizes 288 and 289 of "WRITE command" to the DVD-RAM 300 and the addresses 283-286 are substituted with the detected results thereof, to be outputted to the arbiter 103, and therefore two (2) kinds of commands converted are recorded into the memory 104.

Also, the command issue portion 409 issues the "WRITE sector command" to the HDD 200 and "READ command" to the DVD-RAM 300, if the "H/D" is "0", i.e., it is the copy from the DVD-RAM 300 to the HDD 200, thereby writing it into a certain region of the memory 104 through the arbiter 103.

Next, the arbiter 103 issues the "READ sector command", being the ATA command read out from the memory 104 to the HDD 200. To the DVD-RAM 300 is issued the packet command read out from the memory 104, and following thereto, the "WRITE command" is issued, so as to operate the spindle motor 107, and thereby completing the preparation for writing onto the DVD-RAM through the front-end portion 105 and the optical pickup 106. From the time point when the HDD 200 completes the preparation for data transfer, the read-out of data is started, and during the time period when the arbiter 103 selects the HDD 200, the data from the HDD 200 is write into the memory 104. In the similar manner, during the time period when the arbiter 103 selects the front-end portion 105, the data from the HDD 200, which is recorded into the memory 104, temporarily, is supplied to the front-end portion 105, and recorded onto the DVD RAM, sequentially.

At the time when both the HDD 200 and the DVD-RAM 300 complete the transfer of data of sizes that are set into the parameters, the HDD 200 and the DVD-RAM 300 end the data transfer operations thereof. In the copy operation of this recording/reproducing apparatus 100, data transfer is carried out, automatically, between the HDD 200 and the DVD-RAM 300, upon issuances of the control signals of one (1) system from the input/output portion 101.

In case of no use of the present embodiment, it is necessary to issue the "WRITE command" and the "READ sector command" to the input/output portion 101, respectively. Also, during the time period of data transfer, since the recoding data is transferred to the input/output portion 101, therefore it is impossible to issue other commends to the input/output portion 101.

On the contrary to that, according to the present embodiment, since no copying is carried out with using the input/output portion 101, the copy data will not be outputted onto the input/output portion 101. Therefore, copying can be made without occupying the bus, thereby reducing the load upon the microprocessor, for example, for controlling the recording/reproducing apparatus 100 from an outside thereof. As a result thereof, it contributes to achieve high speed copying between the recording media. Also, at the time when arriving the ATA command, or the packet command where the "COPY" command is "0", it constitutes an ordinary access to the HDD 200 and the DVD-RAM 300, thereby enabling to maintain the compatibility thereof.

For reproducing the copy made onto the DVD-RAM 300, the packet command where the "COPY" and is "0" and the "READ command" are issued. The data is written into the memory 104 from the DVD-RAM 300 through the optical pickup 106 and the front-end portion 105, when the arbiter 103 selects the front-end portion 105. Further, when the arbiter 103 selects the controller, it is reproduced from the memory onto the controller 102, and it is outputted from the input/output portion 101 as a reproduction signal.

Herein, the explanation was made that the "MOVE", the "COPY" and the "H/D" are at the seventh ($7^{th}$), the sixth ($6^{th}$) and fifth ($5^{th}$) of the "Features" resistor, however they should not be restricted thereto, in particular, as far as they are other programming bits. Also, the explanation was made only about the structure for decoding the packet command, however it is also possible to obtain the similar effect by assigning the "MOVE" and the "COPY" to the commands of a bender defined implementation. Also, the explanation was given on the copying of data from the HDD 200 onto the DVD-RAM 300, however the similar processes are conducted when copying the data from the DVD-RAM 300 onto the HDD 200, and the direction thereof is determined due to the fact that the "H/D" is "0".

Next, explanation will be given on the operation of "MOVE"; i.e., moving the data recorded on the HDD 200 onto the DVD-RAM 300, with using this control signal.

Due to the fact that the "MOVE" of the "Features" register is "1", the "COPY" thereof is "0", and the "H/D" is "1", and that the command having the "Command" resister of "A0h" is issued to the input/output portion 101, the controller 102 is set into the MOVE mode. Following thereto, due to the fact that the ATAPI command is issued, being inputted and similar to the format shown in FIG. 7, the command being substituted with the logical address and the data transfer size is recorded into the memory 104 from the command issue portion through the arbiter 103. And then, at the time point when the command is issued to the HDD 200 and the DVD-RAM 300, the movement of data is started from the HDD 200 and the DVD-RAM 300. An aspect differing from the copying lies in that the data recorded on the HDD 200 is deleted, sequentially, as soon as it is written onto the DVD-RAM 300 through the memory 104. In the structure, when executing the "MOVE", an interrupt signal in inserted to the microcomputer 108 at the time point when the HDD 200 and the DVD-RAM 300 complete the data transfer of the setting size. The microcomputer 108 detects the interrupt from the DVD-RAM 300. Thus, at the time point when confirming the data was recorded onto the DVD-RAM, the "Write sector command" is issued from the controller 102 to the address on the HDD 200, to which the data transfer was conducted just before the transmission of a managing information region for managing the recording data thereof. For the management information where the data transferred just before lies, an initialization is conducted by, such as, writing ALL "0" therein, for example, thereby deleting the data. The HDD 200 inserts the interruption signal to the microcomputer 108 at the time point when it completes the writing. When detecting the interrupt signal from the HDD 200, the microcomputer 108 forces the controller 102 to issue the "READ sector command" to the HDD 200 therefrom, thereby conducting the next read-out of data. While controlling this series of processes, time-sequentially, the operations of the HDD 200 and the DVD-RAM 300 are ended at the time point when the data transfer is completed of an amount of the setting size thereof. With this, the data of the HDD 200 is copied onto the DVD-RAM 300, and also the original data on the HDD 200 is deleted, thereby completing the movement of data.

According to the present embodiment, it is possible to make a copy of data between the media, while bringing the control bus and the control method of the recording media, being different in the control format thereof, not through the control bus, with achieving the copyright protection. Also, when processing the copy, since it does not pass through the data bus, the load can be lightened on the control processing thereof. Further, since two (2) sets of the recording media drives are integrated in one body, it is possible to obtain a small-sized recording/reproducing apparatus.

Next, explanation will be given on a second embodiment of the recording/reproducing apparatus for copying the data, which is encrypted and recorded on the HDD 200, onto the DVD-RAM 300.

Upon making a copy of the encrypted data, it cannot say that the data is copied, correctly, if the data is simply copied on a separate medium. When recording the encrypted data, not only the data, but also the parameters which was used for calculation out an encryption key or the encryption key itself is encrypted and recorded in a separate area or region therefrom. When reproducing it, first of all, the encryption key is decoded after reproducing the parameters and the encryption key to be used for the calculation of the encryption key, which were encrypted and recorded, thereby calculating out a decryption key. This decrypted key comes to be the same to the encryption key. After setting the decryption key into a decryptor, the data encrypted is reproduced and decrypted. At this stage, the data decrypted can be obtained. From here, the encryption is conducted, again, and the parameters used in the calculation of the encryption key is recorded on the recording medium, on which the data should be copied; thereby it can be said that the data is copied, correctly.

Hereinafter, those having the same functions are attached with the same reference numerals, and are omitted from the explanations thereof.

To the arbiter 103 are newly connected an encryptor 109 and a decryptor 110, in addition to the HDD 200 and the front-end portion 104. The encryptor 109 and the decryptor 110 perform the encryption and the decryption with using encryption/decryption keys, which can be obtained through calculation of a hash function, for example, from a plural number of key information, such as, being made up with a serial number and a manufacturing number, etc., of a product, which are recorded on the HDD 200, for example. Herein, when copying the data and the parameters of the encryption key, which are encrypted and recorded on the HDD 200, onto the DVD-RAM 300, as shown in FIG. 12, a bit indicative of the encryption, such as, "ENC", for example, is newly added into the packet command, for example, the fourth ($4^{th}$) bit of the "Features". And, as the ATAPI command is issued the command having the same structure shown in FIG. 7. When arriving the packet command where the "ENC" is "1" from the input/output portion 101, to the HDD 200 is issued the "READ sector command" converted, while to the DVD-RAM 300 is issued the "WRITE command" following to the packet command, thereby setting for the start of recording. Herein, in a case where the "ENC" bit is set, the encrypted data and the key information, which are reproduced from the HDD 200, are written into a region 1 of the memory 104 through the arbiter 103. The encrypted data and the key information written into the region 1 of the memory 104 are supplied to the decryptor 110 through the arbiter 103, so as to produce the decryption key with using the encryption parameters and the plural number of key information, which are reproduced, and the data decrypted with the decryption key mentioned above is written into other area 2, again. The decrypted plain text written into the other area 2 of the memory 104 is supplied to the encryption portion 109 through the arbiter 103, so as to produce the encryption key from the key information, which is made up with property information of the DVD-RAM 300 and the manufacturing number of the product, etc., and it is treated the encryption thereupon, again, by means of the encryption key, to be written into other region 3 of the memory 104 together with the key information. Then, the cipher text and the key information, which are re-encrypted and written into the region 3 of the memory 104, are supplied to the front-end portion 105 through the arbiter 103, to be recorded onto the DVD-RAM 300.

The arbiter 103 enables a copy re-encrypted, continuously, through conducting the processing of memory writing and reading into/from the regions 1, 2 and 3, time-sequentially. Also, in case of re-encrypting and recording the data and the key information, which are encrypted and recorded onto the DVD-RAM 300, onto the HDD 200, it can be achieved through the similar processing. In this copying operation, since no copy data and the key information is outputted at the input/output portion 101, therefore it is impossible to make an illegal copy thereof. Also, when arriving the ATA command or the packet command where the "COPY" is "0" from the input/output portion 101, since it is an ordinary access to the DVD-RAM 300, in the operation thereof, therefore it is possible to maintain the compatibility with the conventional one.

According to the present embodiment, for the media being different in the control format thereof, it is possible to bring the control bus and the control method thereof to be common with, but without passing through the control bus, thereby enabling to make a copy between the media with achieving the copyright protection. Also, when processing the copy, since it does not pass through the control bus, therefore it is possible to lighten the load when conducting the process control. Further, with integrating the two (2) sets of the recording media drive into one body, it is possible to obtain a small-size recording/reproducing apparatus.

Figure 11:
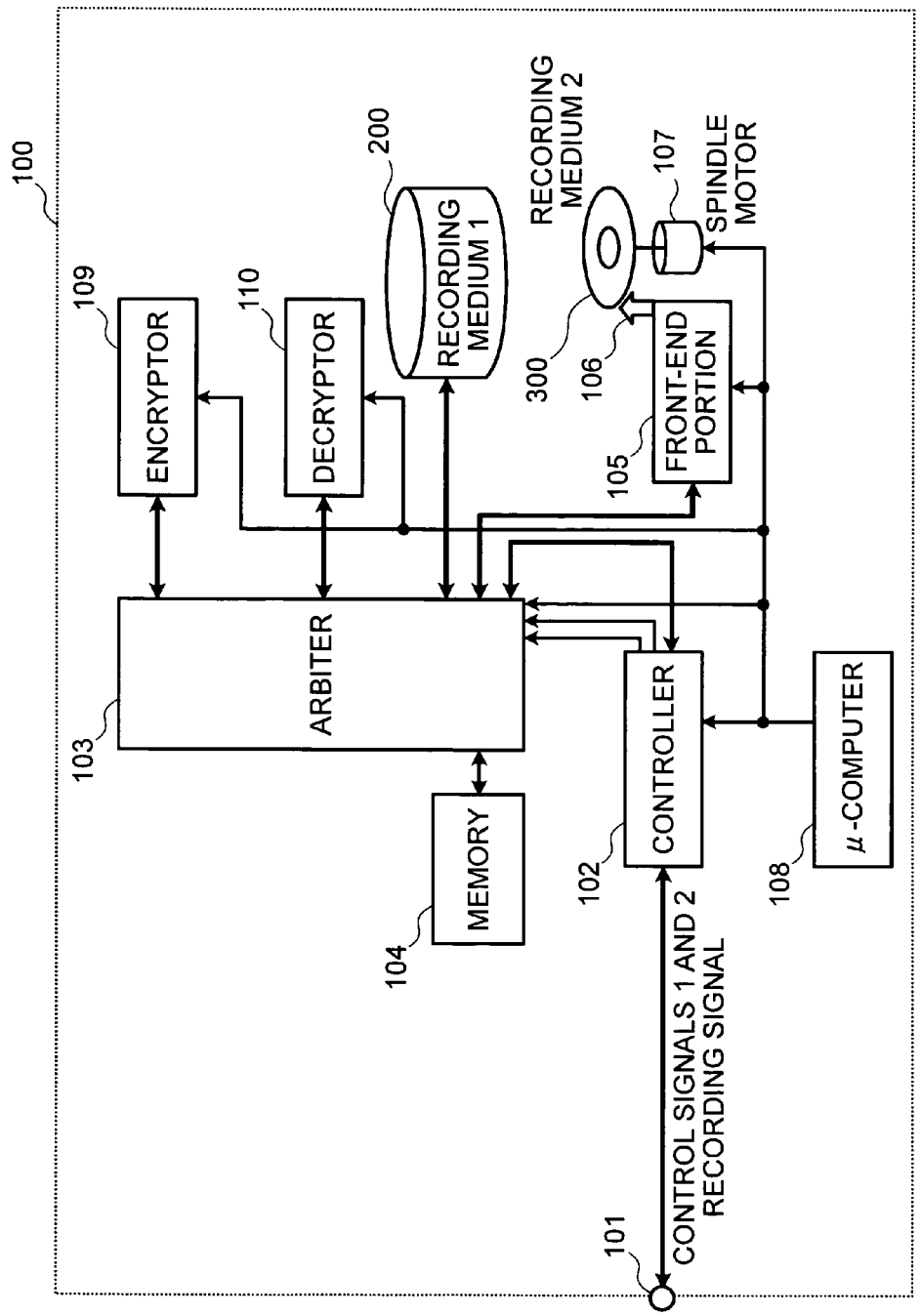
FIG. 11 is a block diagram for showing the structure of the recording/reproducing apparatus, according to a second embodiment of the present invention.
Figure 13:
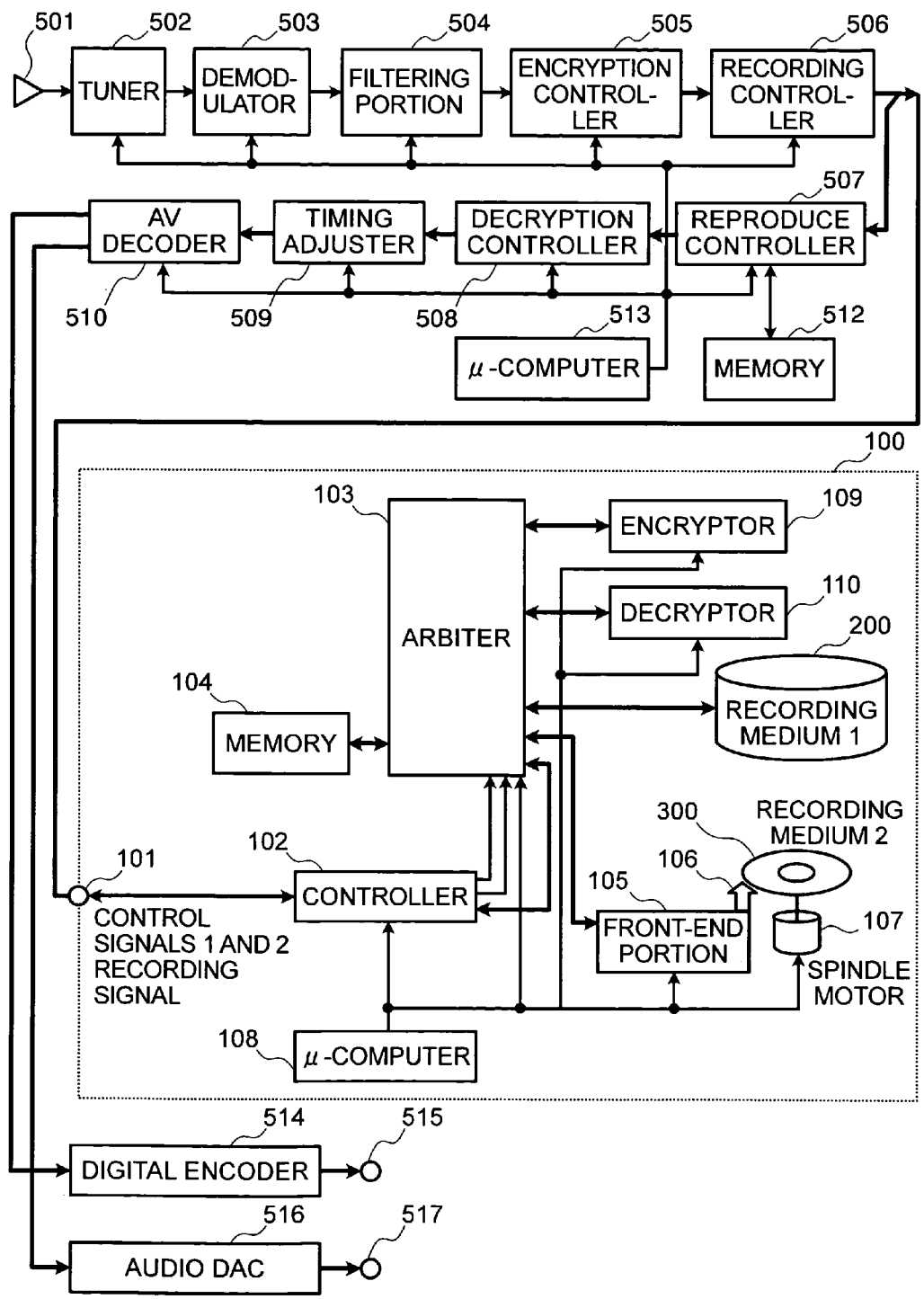
FIG. 13 is a block diagram for showing the structure of a third embodiment, in which the second embodiment of the present invention is applied into a STB.

Next, FIG. 13 shows the structure of a third embodiment, in which the recording/reproducing apparatus according to the second embodiment (in FIG. 11) is applied into a set top box (STB) of a digital receiver for satellite broadcasting. Explanation will be given from the flows of signals in the processes of recording/reproducing.

A reference numeral 501 indicates a tuner portion, for selecting one (1) transponder frequency, on which the program is multiplexed for conducting the recording upon the recording/reproducing apparatus, thereby outputting bit stream within the one (1) transponder selected to the decryptor 503. The decryptor 503 conducts the decryption and the error correction upon the bit stream inputted from the tuner 501 and converts it into MPEG2-transport stream (TS), thereby outputting it to a filtering portion 504. The filtering portion 504 separates a PES packet of audio and video of one (1) program from the MPEG2-TS, which is inputted therein from the decryptor 503, so as to convert the MPEG2-TS into the plaintext, to be encrypted in an encryption controller 506, thereby being recorded onto the recording/reproducing apparatus 100 through a recording controller 506. In this instance, also the key information of the encryption key, which was used in the encryption controller 505 is recorded onto the recording/reproducing apparatus 100. When reproducing, the cipher text and the key information, which is recorded onto the recording/reproducing apparatus 100 and to re reproduced, are searched out with an aid of a reproduction controller 507, to be read out. Next, in a decryption controller 508, the setting is made thereon after calculation of the decryption key being same to that when recording, with using the key information reproduced, and then the decryption is conducted upon the cipher text. This decrypted MPEG2TS reproduces and output an access unit thereof in a timing adjustment portion 509, when PTS (Presentation Time Stamp) coincides with STC (System Time Clock) within a standard decryptor of the MPEG system. An output of the timing adjustment portion 509 mentioned above is supplied into an A/V decoder 510. Within the A/V decoder 510, the PES packet of audio and video inputted are decoded, wherein the video data is outputted into a digital encoder 514 and the audio data into an audio DAC 516, respectively. The digital encoder 514 converts the video data received from the A/V decoder 510 into a television output signal, to be outputted into an outside through an output terminal 515. The audio DAC 516 converts the audio data received from the A/V decoder 510 into an analog signal, to be outputted into the outside through an output terminal 517.

In this STB, explanation will be made on the processes for moving the contents of the digital satellite broadcasting, which is encrypted and recoded onto the HDD 200, onto the DVD-RAM 300, for the purpose of storage thereof.

First of all, about the movement between the HDD 200 and the DVD-RAM 300, where only the input/output portion 101 is common with, for example, though not corresponding to the present embodiment, since the processes from the decryption up to the re-encryption cannot be closed within the recording/reproducing apparatus 100, there are used the encryption process portion 505 and the decryption process portion 508 of the STB. In more details thereof, after decrypting the encrypted contents, which is reproduced from the HDD 200, within the decryption process portion 508, it is treated with the encryption thereupon, again, within the encryption process portion 505, thereby being recorded onto the DVD-RAM 300. For treating such the processes thereon, controls are necessary upon the encryption process portion 505 and the decryption process portion 508; therefore the load upon the microcomputer 513 comes to be large.

Then, it is possible to conduct the above but without the necessity of controls by means of the microcomputer 513, by applying the present embodiment into this STB; thereby, issuing a MOVE command, which can be obtained through expansion of the packet command, while bringing the control signal into a one line, which is issued from the microcomputer 513 to the recording controller 506. In more details thereof, the decryption process is conducted within the decryptor 110 and the re-encryption process within the encryptor 109, when moving the contents, which were recorded onto the HDD 200 once, onto the DVD-RAM 300; thereby, achieving the movement with treating the encryption process thereupon, but without passing through the input/output portion 101. For this processing, there is no necessity of control by means of the microcomputer 513; therefore the microcomputer 513 can execute other controls than that. With this, it is possible to contributes high-speed on the movement from the HDD 200 to the DVD-RAM 300 and the copying processes thereof.

Also, when reproducing, in particular, in both cases when reproducing either one of the HDD 200 and the DVD-RAM

300, since the key information, which is encrypted and recorded within the medium, is read out, so as to produce the decryption key within the decryption controller 508; therefore, it is possible to decrypt the data, which is encrypted and recorded, thereby reproducing it, correctly.

According to the present embodiment, while bringing the control bus and the control method of the recording media, being different in the control formats thereof, to be common with, it is possible to conduct the copying of data between the media, but without passing through the control bus, with achieving the copyright protection. Also, when processing the copying, since it does not pass through the control bus, it is possible to reduce the load for controlling processes.

Figure 14:
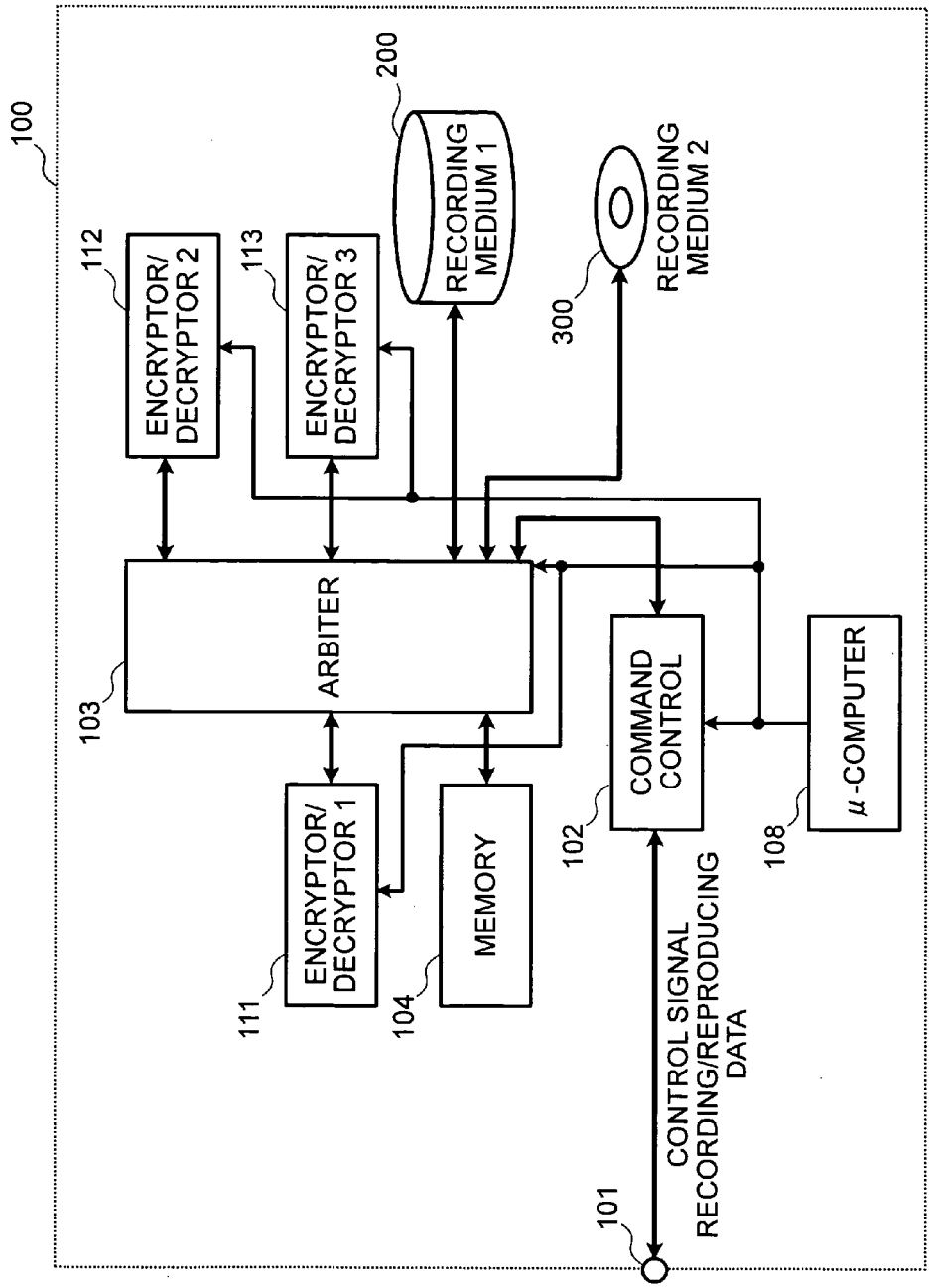
FIG. 14 is a block diagram for showing the structure of the recording/reproducing apparatus, according to a fourth embodiment of the present invention.

FIG. 14 is an outlook view for showing a fourth embodiment of the recording/reproducing apparatus, into which the present invention is applied. A reference numeral 101 is an input/output portion for inputting/outputting a control signal and recording/reproducing data to the hard disk drive (HDD) and the optical disk drive, and it is an interface being built up with 16 pins of data bus and 40 pins for the control signals including, for example, an address, etc. A reference numeral 102 depicts a controller for decoding the control signals and the data bus, so as to control the command to be issued. A reference numeral 103 is an arbiter for processing the write-in and read-out into/from a memory 104, in time-sharing manner, and a reference numeral 104 is the memory. Each of reference numerals 111, 112, and 113 depict an encryptor/decryptor for conducting an encryption process and a decryption process upon the recording/reproducing data, a reference numeral 108 a controller for controlling the controller 102, the arbiter 103, the encryptor/decryptors 111, 112 and 113, and in more details thereof, it is a microcomputer. A reference numeral 200 depicts a first recording medium, i.e., a HDD, 300 a second recording medium, i.e., an optical disk drive (ODD). As such the optical disk, such as a DVD-RAM can be utilized, and it is removable to a drive thereof. A reference numeral 100 depicts a recording/reproducing apparatus, into which those are integrated or unified together.

Herein, explanation will be given about the operation of recording data onto the HDD 200, by referring to FIG. 14. As was mentioned previously, the command shown in FIG. 3 (herein, a write sector command, for example) is supplied as the control signal from the input/output portion 101 into the controller 102, in accordance with the command protocols shown in FIG. 2.

The controller 102 analyzes the command received, and in a case where the "Device/Head" thereof is "0", for example, supplies that command to the HDD 200 through the arbiter 103, as to be the command to the HDD 200. Following to the above, the recording data inputted from the input/output portion 101 is stored into the memory 104 through the controller 102 and the arbiter 103. Herein, the recording data inputted from the input/output portion 101 is encrypted; therefore the recording data stored therein is decrypted into the original data within the encryptor/decryptor 111, thereby to be stored into the memory 104, again, with an aid of the arbiter 103. Next, the arbiter 103 encrypts that data within the encryptor/decryptor 112, again, thereby storing into the memory 104. In this instance, an encryption algorithm of the encryptor/decryptor 111 and an encryption algorithm of the encryptor/decryptor 112 are different from each other, and therefore also an encryption/decryption key to be supplied to the encryptor/decryptor 111 and an encryption/decryption key to be supplied to the encryptor/decryptor 112 are different from. With this, the recording data encrypted, which is inputted from the input/output portion 101, and the data, which is encrypted within the encryptor/decryptor 112 and stored into the memory 104 are completely different from each other. Following thereto, the arbiter 103 supplies the data, which is encrypted within the encryptor/decryptor 112 and stored into the memory 104, to the HDD 200, and therefore that data is recorded onto the HDD 200.

Herein, the encryption/decryption key to be supplied to the encryptor/decryptor 111 is a one, which is commonly owned in advance, between a host not shown in the figure. This encryption/decryption key is a temporary one, which is owned commonly, in advance to the time of recording operation and is destroyed or cancelled after completing the recording operation, for example.

Also, the encryption/decryption key to be supplied to the encryptor/decryptor 112 is a value, which can be obtained from the secret key information held by the microcomputer 108, a random number generated by the microcomputer 108, and/or a plural number of key information held by the HDD 200, being made up with the manufacturing serial number or the like, through the hash calculation, for example. For the purpose of producing the same encryption/decryption key when reproducing, on the HDD 200 is recorded the ransom number mentioned above, i.e., the one of the key information. Also, this ransom number may be recorded, after being encrypted separately.

Next, explanation will be given about the case where data is recorded onto the ODD. As was mentioned in the above, the command shown in FIG. 5 (herein, the write command, for example) is supplied from the input/output portion 101 into the controller 102, in accordance with the command protocol shown in FIG. 4.

The controller 102 analyzes the command received, and in a case where the "Device/Head" thereof is "1", for example, and it supplies that command to the ODD 300 through the arbiter 103, as a command to the ODD 300. Following thereto, the recording data inputted from the input/output portion 101 is stored into the memory 104 through the controller 102 and the arbiter 103. Herein, the recording data inputted from the input/output portion 101 is encrypted, and therefore the recording data stored therein is decrypted into the original data within the encryptor/decryptor 111, to be stored into the memory 104, again, with an aid of the arbiter 103. Next, the arbiter 103 encrypts that data within the encryptor/decryptor 113, again, thereby storing into the memory 104. In this instance, an encryption algorithm of the encryptor/decryptor 111 and an encryption algorithm of the encryptor/decryptor 113 are different from each other, and therefore also an encryption/decryption key to be supplied to the encryptor/decryptor 111 and an encryption/decryption key to be supplied to the encryptor/decryptor 113 are different from. With this, the recording data encrypted, which is inputted from the input/output portion 101, and the data, which is encrypted within the encryptor/decryptor 112 and stored into the memory 104 are completely different from each other. Following thereto, the arbiter 103 supplies the data, which is encrypted within the encryptor/decryptor 113 and stored into the memory 104, to the HDD 200, and therefore that data is recorded onto the HDD 200.

Also, in the similar manner to the time when recording onto the HDD 200, a portion of the key information for producing the encryption/decryption key, which is to be supplied into the encryptor/decryptor 113, is recorded on the ODD 300. However, for protecting it from the illegal copying, it is also possible to use a peculiar or unique secret information recorded on the optical disk, which is inserted into the ODD 300, as a one of the key information for producing the encryption decryption key.

Next, explanation will be given about the reproducing operation. The controller 102 analyzes the command received, and in the case where the "Device/Head" thereof is "0", for example, it supplied that command to the HDD 200 through the arbiter 103, as the command to the HDD 200. Following thereto, the data read out from the HDD 200 is stored into the memory 104 through the arbiter 103. The readout data stored therein is decrypted into the original data within the encryptor/decryptor 112, to be stored into the memory 104, again, with an aid of the arbiter 103. Next, the arbiter 103 encrypts that data within the encryptor/decryptor 111, and store it into the memory 104. In this instance, the encryption/decryption key supplied into the encryptor/decryptor 111 is the one, which is commonly owned in advance, between the host side not shown in the figure, as was mentioned previously. Following thereto, the arbiter 103 outputs the data, which is encrypted within the encryptor/decryptor portion 111 and stored into the memory 104, into the input/output portion 101 through the controller 102.

Also, the controller 102 analyzes the command received, and in the case where the "Device/Head" thereof is "1", for example, it supplied that command to the ODD 300 through the arbiter 103, as the command to the ODD 300. Following thereto, the data read out from the ODD 300 is stored into the memory 104 through the arbiter 103. The readout data stored therein is decrypted into the original data within the encryptor/decryptor 113, to be stored into the memory 104, again, with an aid of the arbiter 103. Next, the arbiter 103 encrypts that data within the encryptor/decryptor 111, and store it into the memory 104. In this instance, the encryption/decryption key supplied into the encryptor/decryptor 111 is the one, which is commonly owned in advance, between the host side not shown in the figure, as was mentioned previously. Following thereto, the arbiter 103 outputs the data, which is encrypted within the encryptor/decryptor 111 and stored into the memory 104, into the input/output portion 101 through the controller 102.

Next, explanation will be made on the operation in the case when making a copy from the HDD 200 onto the ODD 300. The controller 102 analyzes the command received, and in the case where it is the command upon copying from the HDD 200 onto the ODD 300, for example, it supplies a command of read-out to the HDD 200 while a command of write-in to the ODD 300, respectively, through the arbiter 103. Following thereto, the data read out from the HDD 200 is stored into the memory 104 through the arbiter 103. The read-out data stored therein is decrypted into the original data within the encryptor/decryptor 112, again, with an aid of the arbiter 103. Next, the arbiter 103 decrypts that data within the encryptor/decryptor 113, and stores it into the memory 104. In this instance, the encryption algorithm of the encryptor/decryptor 111 and that of the encryptor/decryptor 113 are different from each other. Following thereto, the arbiter 103 supplies the data, which is encrypted within the encryptor/decryptor 113 and stored into the memory 104, onto the ODD 300, thereby recording that data onto the ODD 300.

According to the present embodiment, the encryption/decryption processing upon the data, which in inputted/outputted at the input/output portion 101, the encryption/decryption processing for the recording medium, i.e., the HDD 200, and the encryption/decryption processing for the ODD 300 are conducted, separately; therefore the secrecy of the encryption/decryption processing of the HDD 200 and the ODD can be increased. Also, for the host side, it is sufficient only to conduct the encryption/decryption processing upon the data inputted/outputted through the input/output portion 101; therefore, there is no necessity of treating the encryption/decryption processing upon the recording media, separately. Further, it is possible to bring the control buses and the control methods of the recording media, being different in the command protocols thereof, to be common with, thereby enabling to make data copying between the media, with achieving the copyright protection, but without passing through the control bus. Further, when conducting the copying process, since not passing through the control bus, the load of the control processing can be lighten. Moreover, the two (2) recording media is integrated into a one body, then a small-sized recording/reproducing apparatus can be obtained.

Figure 15:
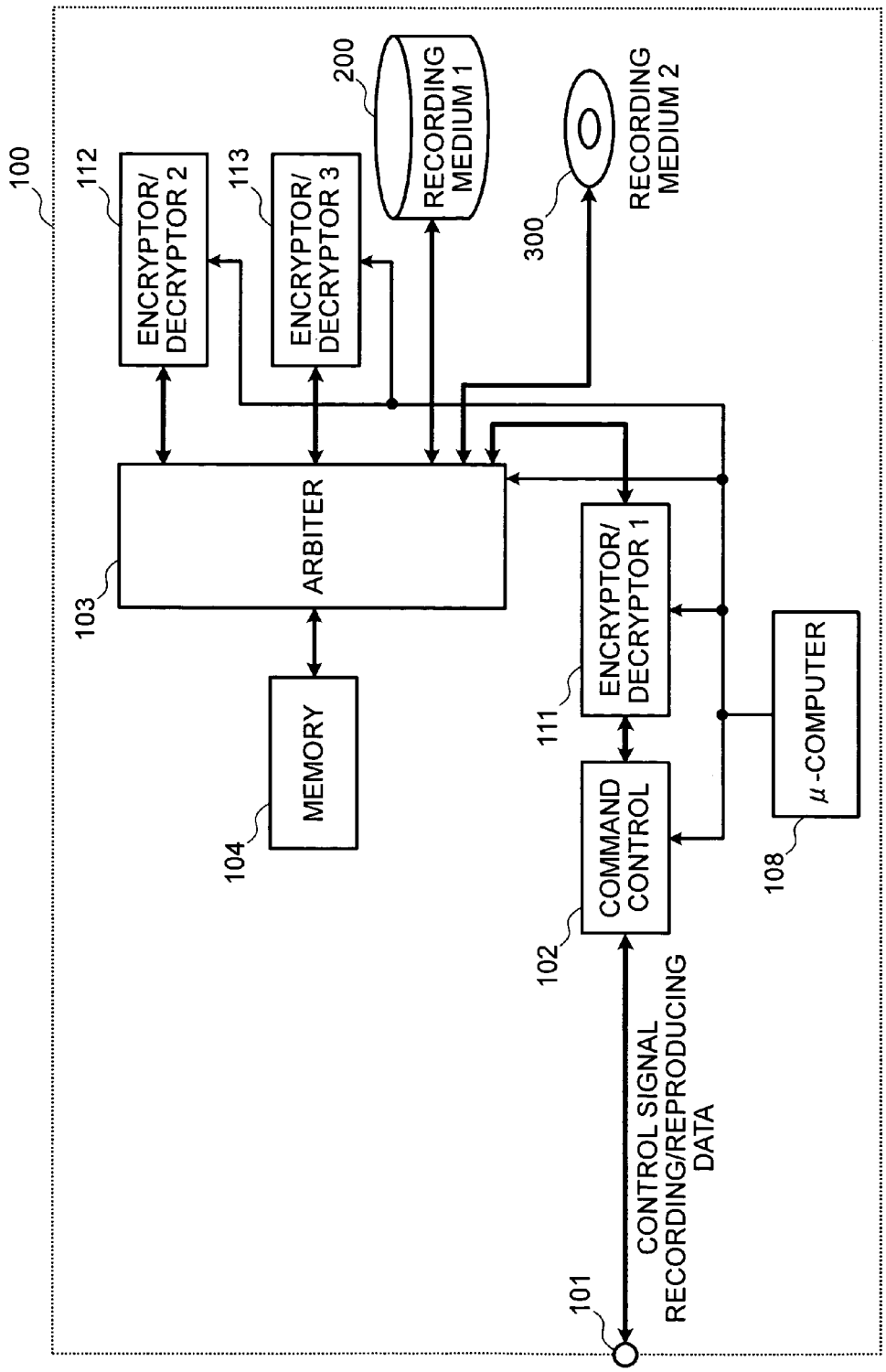
FIG. 15 is a block diagram for showing the structure of the recording/reproducing apparatus, according to a fifth embodiment of the present invention.

FIG. 15 shows a fifth embodiment of the recording/reproducing apparatus. Herein, the encryptor/decryptor 111 is provided between the controller 102 and the arbiter 103. Though the inputted/outputted data passing through the input/output portion 101 is processed within the encryptor/decryptor 111, after being stored into the memory 104, once, in the fourth embodiment (see FIG. 14), however according to the present embodiment, the encryption/decryption processing is conducted upon the data by means of the encryptor/decryptor 111, during the transmission thereof between the controller 102 and the arbiter 103. In case of this fifth embodiment, it is also possible to conduct the operation similar to that of the fourth embodiment, and further an amount of the data transmission can be lighten between the arbiter 103 and the memory 104.

Figure 16:
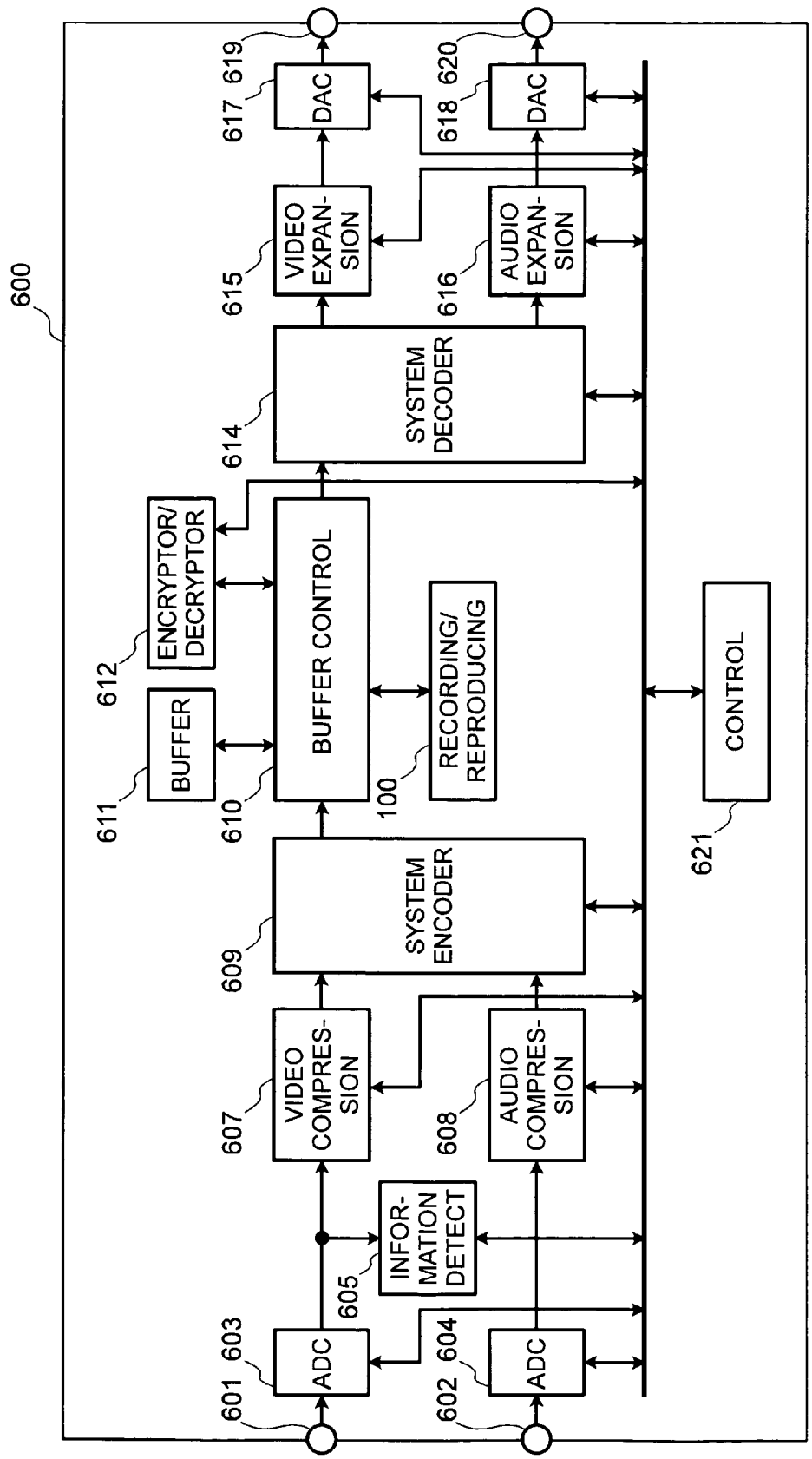
FIG. 16 is a block diagram for showing the structure of a digital recorder, according to a sixth embodiment of the present invention.

FIG. 16 shows a sixth embodiment, where the recording/reproducing apparatus 100 is applied into a digital recorder (i.e., a video/audio signal recording/reproducing apparatus). The digital recorder 600 comprises a video-signal input terminal 601 and an audio-signal input terminal 602, a video-signal A/D converter 603 and an audio-signal A/D converter 604, a copy restriction information detector portion 605, a video-signal compressor portion 607 and an audio-signal compressor portion 608, a system encoder 609, a buffer controller 610, a buffer 611, which is made up with a semiconductor memory, for example, and an encryptor/decryptor 612, at an input side of the recording/reproducing apparatus 100. Also, at an output side thereof, there are included a system decoder 614, a video-signal expander portion 615 and an audio-signal expander portion 616, a video-signal D/A converter 617 and an audio-signal D/A converter 618, a video-signal output terminal 619 and an audio-signal output terminal 620, and a controller 621.

The video-signal inputted from the video-signal input terminal 601 is converted into a digital signal within the video-signal A/D converter 603, and it is inputted into the video-signal compressor portion 607, as well as, to the copy restriction information detector portion 605. Within the copy restriction information detector portion 605, the copy restriction information is detected, which is superposed onto the video-signal, such as, on the vertical blanking period thereof, for example. The copy restriction information may be information having a meaning of, such as, "Copy Free", "Copy One Generation" or "No More Copy", and the following operation will not be conducted when it is the "No More Copy".

Within the video-signal compressor portion 607, compression coding data is produced in accordance with a video-compression coding method, such as, a regulation of ISO/IEC 13818-2 (commonly, named by MEPG2 Video) MP@ML (Main Profile@Main Level), for example. However, the video-compression coding method should not be limited to this, but it may be a regulation method of JPEG or the like. The video data produced in accordance with the compression coding method is inputted into the system encoder 609.

Also, the audio signal inputted from the audio-signal input terminal 602 is treated with analog/digital conversion at a predetermined sampling rate within the audio-signal A/D converter 604. The audio signal converted into the digital signal is inputted into the audio-signal compression portion 608. Within the audio-signal compression portion 608, compression coding data is produced in accordance with an audio-compression coding method, such as, a regulation of ISO/IEC 13818-1 (commonly, named by MEPG2 Audio), for example. However, the audio-compression coding method should not be limited to this, in particular. The audio data produced in accordance with the compression coding method is inputted into the system encoder 609.

The compression-coded video data and the compression-coded audio data, which are inputted into the system encoder 609, are packetized and multiplexed, respectively, and after being converted into a one (1) piece of system stream, it is inputted into the buffer 611 through the buffer controller 610. Onto the system stream are added a size of the original video, an aspect ratio, bit rates of the compression-coded video data and the compression-coded audio data within the system stream, and the copy restriction information, etc., as additional information thereof. Herein, the "Copy One Generation" is detected within the copy restriction information detector portion 605, it is added, onto the system stream after being changed into "No More Copy" as the copy restriction information to be added thereto.

The system stream accumulated within the buffer 611 is encrypted within the encryptor/decryptor 612, using the encryption/decryption key, which is commonly owned, in advance, for data transmission between the recording/reproducing apparatus 100, and it is stored into the buffer 611, again, to be transmitted from the buffer controller 610 to the recording/reproducing apparatus 100. In this instance, the encryption algorithm of the encryptor/decryptor 612 is same to the encryption algorithm of the encryptor/decryptor 111 of the recording/reproducing apparatus 100, and to the encryptor/decryptor 111 is supplied the encryption/decryption key, being same to that, which is supplied to the encryptor/decryptor 612.

However, as the key information for producing the encryption/decryption key to be supplied to the encryptor/decryptors 112 and 113 within an inside of the recording/reproducing apparatus 100, it is possible to supply the unique information, which is held by the controller 621, into the recording/reproducing apparatus 100.

Herein, the encryption of the system stream within the encryptor/decryptor 612 is conducted, but only a case when the information is detected, such as, the "Copy One Generation", within the copy restriction information detector portion 605, for example, however it must not be encrypted when it is the "Copy Free".

On the other hand, the system stream reproduced from the recording/reproducing apparatus 100 is stored into the buffer 611 through the buffer controller 610. The system stream stored into the buffer 611 is decrypted within the encryptor/decryptor 612, also in this case, with using the encryption/decryption key commonly owned for the data transmission between the recording/reproducing apparatus 100, to be stored into the buffer 611, again, and it is inputted into the system decoder 614 through the buffer controller 610.

The system stream inputted into the system decoder 614 is separated into the packets of compression-coded video data and compression-coded audio data, respectively, and the compression-coded video data taken out from the each packet is inputted into the video-signal expansion portion 615 while the compression-coded audio data into the audio-signal expansion portion 616. The video signal, being obtained with the treatment of expansion thereupon, is inputted into the video-signal D/A converter 617 while the audio-signal into the audio-signal D/A converter 618, to be converted into analog signals, and they are outputted from the video-signal output terminal 619 and the audio-signal output terminal 620, respectively.

The operation within the inside of the recording/reproducing apparatus 100 is as mentioned by referring to the fourth and fifth embodiments in the above. Thus, by means of the command issued from the controller 621 through the buffer controller 610, it is determined on which recoding medium should be made the recording or reproducing within an inside of the recording/reproducing apparatus 100. Also, in the case where the recording or the reproducing should be made on any one of the recording media, it is sufficient to treat the encryption/decryption processes of one (1) kind, i.e., that of the encryptor/decryptor 612, thereby the circuit scale and the load for the processing being lightened.

Herein, when the controller 621 issues the copy command mentioned previously, the copying process is conducted within an inside of the recording/reproducing apparatus; therefore no data transmission occurs between the recording/reproducing apparatus 100 and the butter 611. Accordingly, it is possible to make the data copying between the media at high speed, while aching the copyright protection with high security thereof. Also, it is possible to lighten the load of controlling processes of the controller 621.

According to the present invention, the usability of the recording/reproducing apparatus can be improved for a user thereof, in particular, when making data copying between the recording media being different from each other.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A recording/reproducing apparatus for recording and reproducing a digital signal onto first and second recording media, comprising:
   an input/output portion through which a control signal and the digital signal for recording and reproducing are inputted and outputted;
   a controller for performing two kinds of controlling based on one kind of control signal inputted at said input/output portion, wherein the two kinds of controlling are different from each other and correspond to said first and said second recording media, respectively;
   a first encryptor/decryptor for encrypting and decrypting the digital signal inputted/outputted at said input/output portion;
   a second encryptor/decryptor for encrypting and decrypting the digital signal to be recorded and reproduced onto/from said first recording medium;
   a third encryptor/decryptor for encrypting and decrypting the digital signal to be recorded and reproduced onto/from said second recording medium;
   a memory for temporarily storing the digital signal; and
   an arbitrator for arbitrating write-in and read-out of the digital signal among said first and second recording media, said first, second and third encryptor/decryptor, and said memory, in a time-sharing manner.

2. The recording/reproducing apparatus as in claim 1, wherein the digital signal inputted into said input/output portion is decrypted within said first encryptor/decryptor, is encrypted within said second encryptor/decryptor, and is recorded onto said first recording medium based on the control signal.

3. The recording/reproducing apparatus as in claim 1, wherein the digital signal inputted into said input/output portion is decrypted within said first encryptor/decryptor, is encrypted within said third encryptor/decryptor, and is recorded onto said second recording medium based on the control signal.

4. The recording/reproducing apparatus as in claim 1, wherein the digital signal recorded onto said first recording medium is reproduced, the reproduced digital signal being decrypted within said second encryptor/decryptor, encrypted within said third encryptor/decryptor, and recorded onto said second recording medium based on the control signal.

5. The recording/reproducing apparatus as in claim 1, wherein the digital signal recorded onto said first recording medium is reproduced, the reproduced digital signal being decrypted within said second encryptor/decryptor and encrypted within said first encryptor/decryptor based on the control signal, wherein the encrypted digital signal is output to said input/output portion.

6. The recording/reproducing apparatus as in claim 1, wherein the digital signal recorded onto said second recording medium is reproduced, the reproduced digital signal being decrypted within said third encryptor/decryptor and encrypted within said first encryptor/decryptor based on the control signal, wherein the encrypted digital signal is output to said input/output portion.

7. The recording/reproducing apparatus as in claim 1, wherein the control signal controls said first and second recording media, and wherein the digital signal inputted into said input/output portion is encrypted.

8. The recording/reproducing apparatus as in claim 1, wherein said first encryptor/decryptor, said second encryptor/decryptor and said third encryptor/decryptor are encryption algorithms each being different from one another.

9. The recording/reproducing apparatus as in claim 1, wherein one of said first and said second recording media is a hard disk, and the other of said first and second recording media is an optical disk.

10. A video/audio signal recording/reproducing apparatus using the recording/reproducing apparatus of claim 1, comprising:
 a video/audio signal input portion, to which the video signal and the audio signal are inputted;
 an A/D converter for converting the video signal and the audio signal into digital signals;
 a compressor for compressing the digital video signal and the digital audio signal;
 a fourth encryptor/decryptor for encrypting and decrypting the compressed digital video signal and the compressed digital audio signal;
 an expanding portion for expanding the digital video signal and the digital audio signal into analog signals; and
 a video/audio signal output portion for outputting the analog video signal and the analog audio signal,
 wherein the digital video signal and the digital audio signal are inputted to the input/output portion of the recording/reproducing apparatus, the digital video signal and the digital audio signals being encrypted within said fourth encryptor, and
 wherein the digital video signal and the digital audio signal outputted from said input/output portion are decrypted in said fourth encryptor/decryptor.

* * * * *